United States Patent Office 3,215,230
Patented Nov. 2, 1965

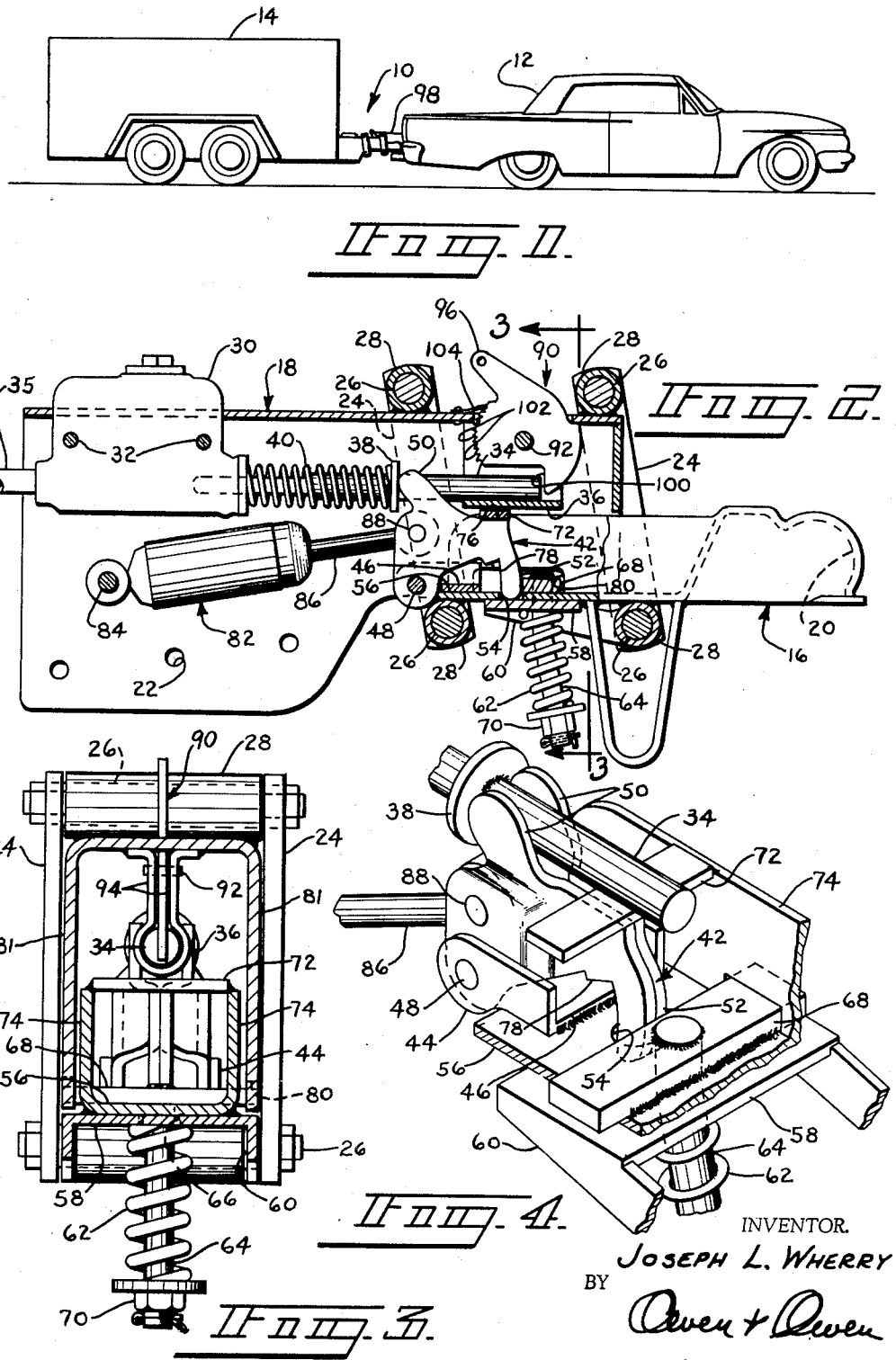

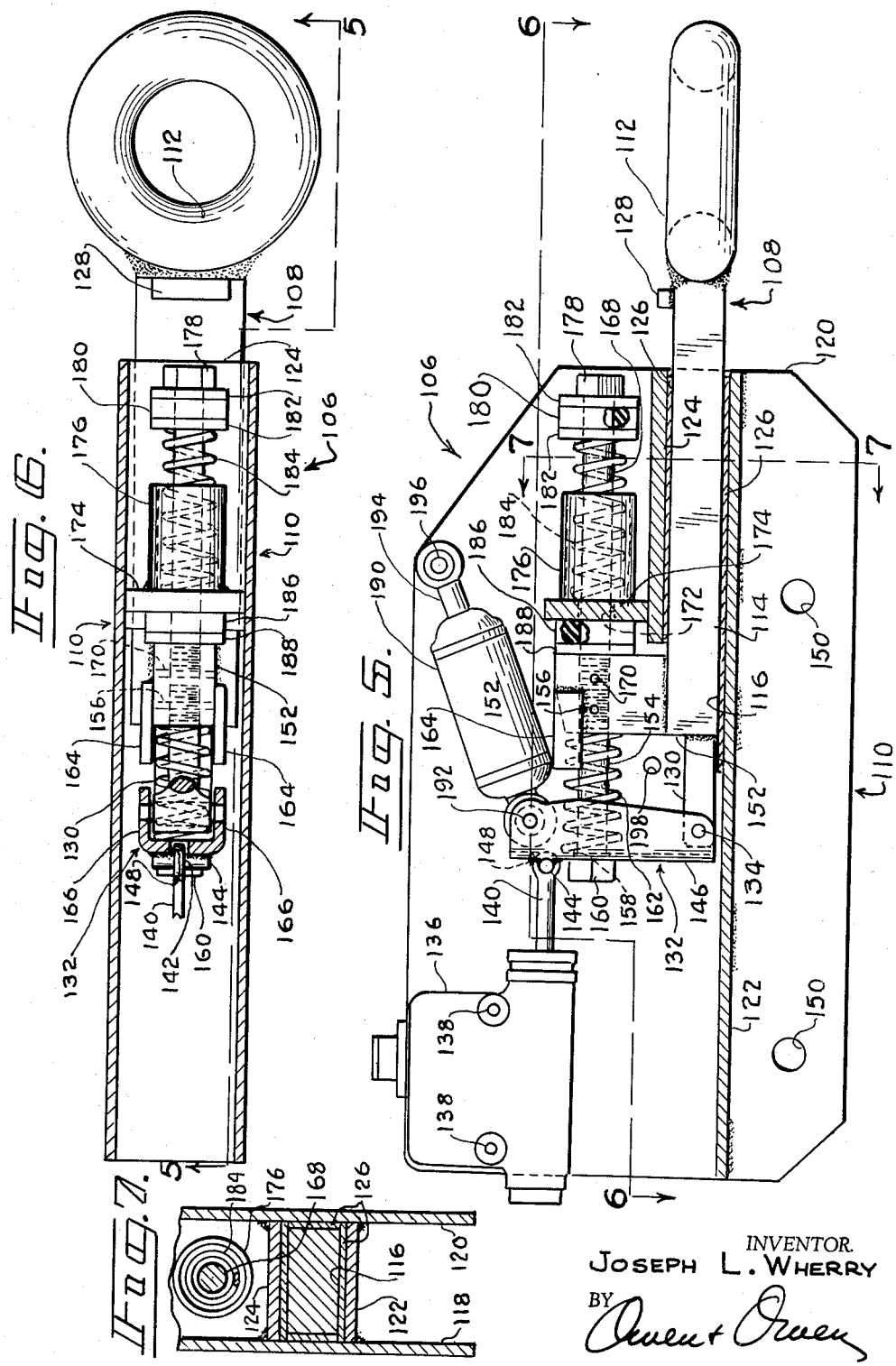

3,215,230
TRAILER HITCH WITH MEANS FOR AUTOMATI-
CALLY ACTUATING TRAILER BRAKES
Joseph L. Wherry, Perrysburg, Ohio, assignor to Toledo
Stamping & Manufacturing Company, Toledo, Ohio, a
corporation of Ohio
Filed Jan. 16, 1963, Ser. No. 252,549
11 Claims. (Cl. 188—112)

This application is a continuation-in-part of application Serial No. 204,806, filed June 25, 1962.

This invention relates to a trailer hitch which has improved means for actuating brakes associated with the trailer.

Many kinds of hitches and couplings similar to that with which the present invention is concerned are known in the art. The trailer hitches have commonly included two members which can move relative to one another and are connected by suitable linkage, with one member attached to the towing vehicle and the other attached to the trailer. A master cylinder or similar device for actuating hydraulic brakes on the trailer is mounted on one member with a piston rod of the master cylinder connected to the other member in a manner such that when the members move toward one another, the piston moves in the cylinder and causes fluid pressure to be transmitted to the brakes. A shock absorber is also commonly connected between the two members to reduce excessive motion between them.

A disadvantage in almost any trailer hitch with brake actuating mechanism is a phenomenon called hunting or chucking, the latter being a term more commonly used in the art. If the towing vehicle tends to slow down more than the trailer, the mechanism of the hitch will cause the trailer brakes to be applied and thereby reduce the trailer speed. As the trailer slows down, the mechanism again returns to normal and the brakes are released. If the towing vehicle should slow down rapidly, however, the trailer brakes may be applied excessively whereupon the trailer slows down more than the towing vehicle and tends to separate therefrom. The hitch of the trailer then abruptly reaches its rear position, causing it to bounce forwardly and sharply apply the brakes a second time. The second application of the brakes again causes the hitch to abruptly reach its rear position which causes the trailer to lurch forwardly and apply the brakes once more. The continual chucking or jerking motion frequently amplifies itself, causing the trailer tires to wear rapidly due to the constant application and release of the brakes; further, this motion has at times been so violent as to actually pull a bumper off the towing vehicle. The chucking action, once started, usually continues until the vehicle comes to a complete stop, or until it is again temporarily accelerated, which is not always possible.

The shock absorber can be designed to be sufficiently stiff to eliminate the chucking phenomenon for most conditions. When this occurs, however, the action of the hitch is likely to be too slow under other conditions so that the brakes will not be applied quickly enough. This is particularly true for a trailer which carries loads of varying weights. If the shock absorber is designed to be sufficiently stiff to prevent chucking at relatively heavy loads of the trailer, the action of the shock absorber will be excessively stiff when the trailer is carrying light loads with the result that the brakes do not act quickly enough and may push the rear of the towing vehicle, causing it to skid, particularly if the road is slippery. On the other hand, if the shock absorber is designed to prevent chucking at lighter loads, it will not be effective at heavier loads so that chucking will continue under some conditions.

The present invention provides an improved trailer hitch with means for operating trailer brakes which both overcomes the above disadvantage of trailer brakes heretofore known and attains advantages not heretofore available in trailer hitches. As is true of conventional hitches, the hitch according to the invention employs two members which are movable relative to one another and which are connected to the towing vehicle and the trailer respectively. A brake cylinder and a shock absorber are also employed. These two are mounted on one of the members, but, rather than being connected directly to the other member, are connected to a lever pivotally attached to the other member, which lever compresses a spring during relative movement between the two members and the spring in turn causes actuation of the master cylinder piston rod. Hence, the spring is the force upon which operation of the master cylinder is directly dependent rather than the relative movement between the two members, and this force tends to remain relatively constant regardless of the amount of load in the trailer. Thus, the brakes will tend to be actuated to the proper extent regardless of whether a heavy or a light load is carried by the trailer.

The trailer hitch according to the invention can have another advantage in that the spring which powers the piston rod of the master cylinder is readily adjustable by a wrench or pliers without disassembly or removing any components of the hitch. Once the spring is properly set, no further adjustment is usually necessary. With this arrangement, a single trailer hitch can be adapted for many weights and sizes of trailers because of the wide variety for which compensation can be easily made. Because of this feature, it is no longer necessary to provide different trailer hitches with a specific shock absorber and other components for many narrow ranges of sizes and weights of trailers.

It is, therefore, a principal object of the invention to provide a trailer hitch with an improved brake actuating mechanism which eliminates chucking for a wide variety of conditions.

Another object of the invention is to provide a trailer hitch with an improved braking mechanism employing resilient means for supplying force to a piston rod of a master cylinder.

Other objects and advantages of the invention will be apparent from the following detailed description of a preferred embodiment thereof, reference being made to the accompanying drawing, in which:

FIG. 1 is a somewhat schematic plan view of a trailer hitch embodying the principles of the invention connecting a towing vehicle and a trailer;

FIG. 2 is a view in elevation, with parts broken away and with parts in cross section, of the trailer hitch shown in FIG. 1;

FIG. 3 is a vertical, lateral view in cross section taken along the line 3—3 of FIG. 2;

FIG. 4 is a fragmentary view in perspective of a portion of the brake actuating mechanism of the hitch shown in FIGS. 2 and 3;

FIG. 5 is a view in vertical cross section taken along the line 5—5 of FIG. 6, with parts broken away and parts in cross section, of a modified trailer hitch embodying the invention;

FIG. 6 is a view in horizontal cross section taken along the line 6—6 of FIG. 5, with parts broken away and parts in cross section; and FIG. 7 is a fragmentary view in cross section taken along the line 7—7 of FIG. 5.

Referring more particularly to FIG. 1, a trailer hitch indicated at 10 connects a towing vehicle 12 to a trailer 14. The trailer 14 can be of many kinds including cargo trailers, house trailers, camping trailers, and horse trailers, by way of example.

Referring more particularly to FIGS. 2 and 3, the hitch 10 includes a front hitch member 16 and a rear hitch member 18, with the front hitch member 16 adapted to be connected to a hitch knob located on a bumper of the towing vehicle by means of a recess 20, and the rear member 18 adapted to be attached to an existing tongue portion of the trailer 14 by means of suitable bolt holes 22. A number of means for connecting the hitch 10 to the vehicle 12 and the trailer 14 are well known in the art and will not be discussed further.

The front and rear members 16 and 18 are movable longitudinally with respect to one another by means of four parallel links 24 which are connected to bolts or axles 26. These, in turn, are pivotally attached to the front and rear members 16 and 18 by suitable tubes or sleeve bearings 28 which are welded to the two members. As shown in FIG. 2, the rear hitch member 18 is normally in a rear position with respect to the front hitch member 16 and will move forwardly if the vehicle slows down more rapidly than the trailer 14.

A brake actuator or cylinder 30 is mounted on the hitch member 18 by bolts or pins 32 (FIG. 2) and has a piston (not shown) to which is connected a piston rod 34. The rod 34 extends forwardly and is supported in a guide 36 which is also affixed to the rear member 18. Thus, the piston rod 34 is entirely free of the front hitch member 16 and is capable of moving independently of movement between the front and rear members 16 and 18. When the rod 34 is moved rearwardly, it forces the piston into the cylinder 30, thereby increasing hydraulic pressure in the cylinder and transmitting it through a line 35 to hydraulic brakes (not shown) of the trailer 14.

The piston rod also has an actuating flange or engageable portion 38 and a lightweight spring 40 on the rod 34 between the flange 38 and the cylinder 30. The purpose of the lightweight spring 40 primarily is to prevent undue actuation of the brakes of the trailer by providing more resistance to the rearward movement of the brake rod 34 when the trailer 14 is being towed down a slight slope.

The hitch 10 is primarily designed for use with self-actuating or one-way brakes which are self-actuating when the wheels are rotating in a forward direction only, requiring about one-fifth the force to achieve effective braking action as is required when the wheels are rotating in the opposite direction. With such brakes, the trailer 14 can be backed up by the towing vehicle 12 without causing undue actuation of its brakes. In this connection, the hitch members 16 and 18 have a positive stop, to be discussed subsequently, which limits relative movement between them and limits the pressure applied to the hydraulic system.

A tip-over lever or brake-actuating member 42 (see also FIG. 4) is pivotally connected to the front hitch member 16 by a pair of ears 44 which have a cross web 46 welded to the hitch member 16, and by a pin 48. The lever 42 includes a flange-engaging yoke or projections 50 positioned to engage the flange 38 and move it toward the cylinder 30 along with the piston rod 34. This occurs when the distance between the cylinder 30 and the tip-over lever 42 is decreased, which occurs when the trailer 14 is moving at a speed in excess of the speed of the vehicle 12.

The tip-over lever 42 also has a leg or portion 52 which is aligned with an opening 54 in a lower or bottom wall 56 of the front hitch member 16. A clapper plate or actuating plate 58 lies contiguous with the lower surface of the wall 56 and extends across the opening 54 to resist downward movement of the lever leg 52 and the lever 42. The plate 58 is integral with arms 60 which are pivotally mounted on the front lower axle 26 between the ends of the associated tube 28 and the lower ends of the front links 24. An actuating spring 62, which is much heavier than the spring 40, is located around a slightly arcuate mounting rod 64 which extends through a central opening 66 in the plate 58 and is affixed to the lower wall 56 of the front hitch member 16 through a stop bar 68 which is welded thereto. The spring 62 preferably is maintained in compression between the actuating plate 58 and an adjusting nut 70 when the plate 58 is in its uppermost position adjacent the lower wall 56 of the member 16.

The adjusting nut 70 determines the amount of compression for the spring 62 and is preferably tightened to the point where the pressure applied to the brake cylinder 30 provides adequate braking pressure when the hitch members 16 and 18 have reached the limit of movement toward one another. For example, if a pressure of 300 p.s.i. is required for adequate braking, the nut 70 will be adjusted so that pressure in the cylinder is 300–350 p.s.i. when the members 16 and 18 have reached the aforesaid limit of relative movement. Thus, the 350 p.s.i. is the maximum pressure that can be reached in the hydraulic system so that is cannot be burst, even if the trailer should strike an object and abruptly stop when being backed up. For hitches employing brakes which are not self-actuating, an adequate braking pressure in the hydraulic system may be much higher, 900 p.s.i., for example. In that instance, a heavier spring can be substituted for the spring 62. The heavier spring can be adjusted then in the same manner as spring 62.

Counterclockwise movement of the tip-over lever 42 is limited by a stop bar 72 extending between side walls 74 of the front hitch member 16 which is contacted by an upper shoulder 76 of the lever 42. The shoulder 76 normally rides against the stop bar 72 when the vehicle 12 and the trailer 14 are moving at the same speed. Movement of the lever 42 in a clockwise direction is limited by the bottom wall 56 of the front hitch member 16 which is contacted by a lower shoulder 78 on the lever 42. In addition, forward and rearward relative movement between the hitch members 16 and 18 is limited by the bar 68 which extends through the side walls 74 of the front member 16 and cooperates with notches 80 in side walls 81 of the rear member 18. In practice, the shoulder 78 of the lever 42 is designed to contact the bottom wall 54 of the front member 16 before the stop bar 68 contacts the rear extremity of the notches 80.

A shock absorber 82 is pivotally mounted on the rear hitch member 18 by a pivot bolt 84 and has a shock absorber rod 86 which is pivotally connected by a pin 88 to the tip-over lever 42 on the same side of the lever pivot 48 as the flange-engaging yoke 50. The shock absorber 82 has little effect on the braking action of the hitch 10 when the vehicle 12 slows down gradually but produces a delaying action when the brakes of the vehicle are applied abruptly, as will be discussed more fully subsequently.

A break-away lever 90 is pivotally mounted on the rear hitch member 18 by a pin 92 which pivotally supports the lever 90 between legs 94 (FIG. 3) of the guide 36. An arm 96 of the lever 90 is connected independently to the vehicle 12 by a chain 98 (FIG. 1) so that the chain will pull on the arm 96 and move the lever 90 in a clockwise direction if the hitch should become disengaged from the vehicle 12. A shoulder 100 on the lever 90 then contacts the forward end of the piston rod 34 and pushes it rearwardly to actuate the brakes through the cylinder 30. When the lever 90 is moved in the clockwise direction, it is prevented from returning, so as to keep the pressure on the brakes, by teeth 102 which are engaged by a resilient pawl 104.

In operation, upon acceleration of the vehicle 12, the rear hitch member 18 will move rearwardly relative to the hitch member 16 and the tip-over lever 42 will move in a counterclockwise direction until the upper stop shoulder 76 contacts the stop bar 72. Further rearward movement of the rear hitch member 18 can then occur with the shock absorber rod 86 moving out of the shock absorber 82, until the front extremity of the notch 80 contacts the stop bar 68.

If the speed of the vehicle 12 decreases slowly relative to the trailer 14, the hitch member 18 will end to move forwardly with respect to the hitch member 16 and the shock absorber rod 86 will move into the shock absorber 82 with relatively little resistance and with relatively little effect upon the tip-over lever 42. At the same time, the piston rod 34 and the flange 38 move toward the tip-over lever 42 and the yoke 50 thereof. The tip-over lever 42 is then urged in a clockwise direction, causing the leg 52 thereof to move downwardly through the opening 54. The leg 52, however, contacts the clapper plate 58 and the downward movement is resisted by the spring 62. Because the spring 62 is much stronger than the spring 40, the downward movement of the lever 42 is limited with the result that the yoke 50 stays relatively stationary and prevents further forward movement of the flange 38 whereby the piston rod 34 moves rearwardly relative to the cylinder 30 and the pressure in the hydraulic brake system is increased to actuate the brakes.

If the brakes of the vehicle 12 are applied suddenly, the rear hitch member 18 tends to move forwardly very rapidly with respect to the front hitch member 16. In this instance, the shock absorber rod 86 remains relatively rigid so that the rod 86 moves little, if at all, with respect to the shock absorber 82. This causes the tip-over lever 42 to move in its clockwise direction as the rear hitch member moves toward the front one and the tip-over lever 42 thereby overcomes the resistance of the spring 62 and the leg 52 forces the clapper plate 58 in a counterclockwise direction. If the braking action is sufficiently severe, the movement of the tip-over lever 42 continues until the lower stop shoulder 78 thereof contacts the bottom wall 56. During this movement, the yoke 50 moves forwardly faster than the flange 38 while the rod 86 remains rigid relative to the shock absorber 82 so that little, if any, pressure is initially applied to the brakes by the cylinder 30 under the extreme conditions. However, as the tip-over lever 42 moves in its clockwise direction, the resistance of the spring 62 increases as it is compressed further so that the clockwise movement of the lever 42 slows down quickly. As this occurs, the flange 38 catches up with the yoke 50 and causes the rod 34 to apply pressure to the cylinder 30. Hence, with abrupt braking action by the vehicle 12, actuation of the brakes of the trailer 14 is delayed slightly and chucking is prevented. The spring 62 not only resists and stops the clockwise movement of the lever 42 toward the cylinder 30 but also urges it rearwardly so that the pressure applied by the rod 34 actually is determined by the force of the spring 62. Because of this, the action of the hitch 10 is less dependent on the amount of the load carried by the trailer 14 than hitches heretofore known. Once the spring 62 is adjusted, which is relatively easy because the adjusting bolt 70 is exposed, no further adjustment is necessary for different loads. In addition, one hitch can be used with a wide variety of trailers.

Under extremely severe braking conditions, the rear hitch member 18 will continue to move forwardly with respect to the hitch member 16 even after the lower stop shoulder 78 of the lever 42 has contacted the bottom wall 54 of the member 16. This will cause the brakes to begin to be applied because the rod 34 will move forwardly slightly further until the rear extremity of the notch 80 contacts the stop bar 68. The trailer brakes will be applied relatively lightly at first, however, because the movement of the rear member 18 after the lower stop shoulder 78 has contacted the bottom wall 54 is designed to be relatively small.

A modified trailer hitch embodying the invention is shown in FIGS. 5–7 and usually is used for heavier trailers than the hitch of FIGS. 1–4. The hitch 106 is particularly designed for units in the 10,000–15,000 pound class, such as utility and low bed trailers used to haul industrial equipment and search lights, for example.

The hitch 106 includes a front hitch member 108 and a rear hitch member 110. The front hitch member 108 has a heavy ring 112 at the forward end thereof adapted to be attached to a suitable connection on a truck cab or the like. The front member 108 also includes a rectangular shank 114 which is slidably mounted in a rectangular passage 116 in the rear hitch member 110 to enable relative movement between the two members. The rectangular passage 116 is formed by two main side plates 118 and 120, a lower base plate 122, and a supporting plate 124. The passage 116 is lined with wear plates 126 of bronze-faced steel or other suitable material to reduce friction and seizing between the shank 114 and the walls of the passage 116. Maximum movement of the shank 114 into the passage 116 is limited by a positive stop 128 located on top of the shank 114 near the ring 112. The shank 114 also has an extension 130 at the rear thereof to which is pivotally attached a tip-over lever or brake-actuating member 132 connected by a pivot pin 134.

A brake actuator or brake cylinder 136 is mounted on the rear hitch member 110 by suitable bolts or pins 138 and has a piston (not shown) to which is connected a piston rod 140. The rod 140, which is capable of limited pivotal movement, extends forwardly of the cylinder 136 and is pivotally connected to the brake lever 132 by means of a ring 142 formed on the end of the rod 140, through which ring extends a pivot pin 144 which is welded or otherwise suitably affixed to a rear wall 146 of the lever 132. For this purpose, the rear wall 146 has an opening 148 formed therein to receive the end of the piston rod ring 142. When the piston rod 140 is moved rearwardly, it forces the piston into the cylinder 136, thereby increasing hydraulic pressure in the cylinder. This pressure is transmitted to hydraulic brakes of the trailer to which the rear hitch member 110 is attached, as by means of bolts extending through bolt holes 150 in lower portions of the side plates 118 and 120.

An upright support or bearing member 152 is affixed to a rear portion of the shank 114 and moves therewith. A rear guide rod or bolt 154 is threadedly fastened to the upright support 152 and is held against rotation by a cross pin 156. The guide bolt 154 extends through an opening 158 in the rear wall 146 of the lever 132 and has a bolt head 160 on the opposite side of the rear wall 146 to act as a limiting member to limit rearward movement of the lever 132 relative to the support 152. A resilient member 162 is located between the upright support 152 and the rear wall 146 to urge the lever 132 in a rearward direction, normally against the bolt head 160, and toward the cylinder 136. The resilient member 162 can be a thick-walled plastic tube designed to establish a maximum pressure from 1,000 to 1,500 p.s.i. on the brake fluid, although a coil spring can be used for the same purpose, as shown. The resilient member 162 actually applies the brakes as the front member 108 moves rearwardly and moves the lever 132 and the resilient member 162 rearwardly, thereby pushing the lever 132 against the piston rod 140. Thus, the resilient member 162 corresponds to the coil spring 62 of FIGS. 2–4 except that the resilient member 162 is not adjustable. Rather, the member 162 is replaced by another if a change is necessary.

A pair of stops 164 is affixed to the upright support 152 and is positioned to engage sidewalls 166 of the lever 132 to limit the forward movement of the lever 132 relative to the support 152 and the shank 114 and also to limit maximum compression of the resilient member 162. The stops 164 are not essential to the operation, however.

Another guide rod or bolt 168 is threadedly fastened in the upright support 152 and held by a cross pin 170. The bolt 168 extends through an opening 172 in a stationary guide bar or member 174 affixed to the supporting plate 124 and also extends forwardly through a guide tube 176 which is affixed to the stationary guide member 174 and constitutes a portion thereof. At a head 178 of the bolt 168 is a resilient stop washer 180 held between steel side washers 182 with a spring 184 being held on the bolt 168 between the guide bar 174 and one of the side washers 182. The spring 184 functions similarly to the spring 40 of FIGS. 2–4 and is placed under a preload of 200–250 pounds to resist rearward movement of the shank 114 relative to the rear brake member 110. Another resilient stop washer 186 is located on the bolt 168 between the upright support 152 and the guide bar 174 with a side washer 188 located toward the upright 152. The resilient washer 186 normally is squeezed slightly between the upright support 152 and the guide bar 174 when the hitch 106 is in its normal position with the forward brake member 108 connected to a towing vehicle and the rear brake member 110 fastened to a trailer.

Rearward movement of the front brake member 108 relative to the rear brake member 110 is limited by the resilient washer 180 with the side washer 182 hitting the end of the guide tube 176 and thereby limiting the extent to which the bolt 168, the upright support 152, and the shank 114, can travel rearwardly. The stop 128 near the ring 112 engages the end of the suporting plate 124 only under extreme conditions, and thereby acts as a secondary or safety stop. The washer 186 limits the extent to which the front brake member 108 can move forwardly out of the rear brake member 110.

A shock absorber 190 is pivotally mounted on the lever 132 by a pin 192 and has a shock absorber rod 194 pivotally connected to the side plates 118 and 120 of the rear brake member 110 by means of a pivot bolt 196. The action of the shock absorber 190 is similar to that of the shock absorber 82 in that it has little affect on the braking action of the hitch 106 when the towing vehicle slows down gradually, but produces a delaying action when the brakes of the vehicle are applied suddenly, as will be discussed subsequently.

The hitch 106 preferably is employed with one-way brakes which produce relatively little braking action when the trailer is being backed up. However, if desired, the sides plates 118 and 120 can be provided with holes 198 through which a bolt can be inserted before the trailer is to be backed up. The bolt then blocks rearward movement of the upright support 152 and, hence, the brake member 108.

While the various parts of the trailer hitch 106 are arranged differently than in the case of the hitch 10, operation is quite similar. Perhaps the main difference between the two hitches is in the use of the resilient stop washers 180 and 186 to limit relative movement between the hitch members 108 and 110. The pre-load spring 184 also is placed under a stronger pre-load than is the hitch 10.

To review the overall operation of the trailer hitch 106, the forward hitch member 108 tends to be pulled out of or away from the rear hitch member 110 as a trailer is being towed, with the upright support 152 pushing the resilient stop washer 186 against the stationary guide plate 174. This represents the maximum forward position of the forward hitch member 108 relative to the rear hitch member 110. If the towing vehicle should begin to slow down gradually, but faster than the trailer, the forward hitch member 108 will tend to move rearwardly relative to the hitch member 110 and will move the brake lever 132 rearwardly, with this movement being resisted by the pre-load spring 184 in order to prevent excessive actuation of the brakes. As the brake lever 132 moves rearwardly, the rearward movement of the upper end of it is resisted by the piston rod 140 so that the upper end of the lever 132 then tends to move in a clockwise direction. The clockwise movement, however, is resisted by the resilient member 162 which tends to maintain the brake lever 132 in a vertical position during its rearward movement. It is the resilient member 162 then which actually applies the brakes by pushing the brake lever 132 rearwardly and causing the piston rod 140 to move into the brake cylinder 136. With this movement being gradual, the shock absorber 190 has no appreciable affect upon the action of the brake lever 132, with the body of the shock absorber 190 moving away from the bolt 196 during the rearward movement of the lever 132. The rearward movement of the lever 132 continues until the relative movement between the towing vehicle and the trailer stops or until the resilient stop washer 180 is squeezed between the bolt head 178 and the end of the guide tube 176.

With the towing vehicle accelerating relative to the trailer, the forward hitch member 108 is moved away from the rear hitch member 110 with the brake lever 132 moving forwardly with the aid of the bolt head 160. The piston rod 140 thereby moves out of the cylinder 136 and the brakes are released.

If the towing vehicle decelerates suddenly, the relative movement between the two hitch members toward one another is very sudden. In this instance, the rapid relative movement of the brake lever 132 is resisted by the shock absorber 190 which tends to remain relatively fixed so that the upper end of the brake lever 132 does not move rearwardly to the extent that the shank 114 does, whereby the resilient member 162 is initially compressed without any appreciable movement of the piston rod 140 occurring. After a very short delay, the shock absorber 190 tends to move away from the shock absorber rod 194 with the resilient member 162 again moving the brake lever 132 rearwardly toward the bolt head 160 to move the rod 140 into the brake cylinder 136 and apply the brakes. The slight delay brought about by the shock absorber 190, however, is sufficient to delay braking action and prevent chucking.

Various modifications of the above described embodiment of the invention will be apparent to those skilled in the art and it is to be understood that such modifications can be made without departing from the scope of the invention, if they are within the spirit and tenor of the accompanying claims.

What I claim is:

1. A trailer hitch comprising a front hitch member adapted to be connected to a towing vehicle, a rear hitch member adapted to be attached to a trailer, means connecting said hitch members and enabling relative movement therebetween, a hydraulic brake cylinder mounted in a fixed position relative to one of said hitch members, an actuating member movably supported by the other hitch member and having a portion positioned to engage a portion of a piston rod of said hydraulic brake cylinder to move said piston rod toward said cylinder to actuate brakes of the trailer, shock absorber means directly connecting said one hitch member and said actuating member, said shock absorber means providing high resistance to relative movement between said one hitch member and said actuating member upon sudden movement between said hitch members and providing low resistance to relative movement between said one hitch member and said actuating member upon more gradual movement between said hitch members, and resilient means resisting movement of said actuating member in a direction opposite to that which causes the brakes to be actuated, and said resilient means being the sole means for applying pressure through said actuating member to hydraulic fluid in said hydraulic brake cylinder.

2. A trailer hitch comprising a front hitch member adapted to be connected to a towing vehicle, a rear hitch member adapted to be attached to a trailer, means connecting said hitch members and enabling relative movement therebetween, a hydraulic brake cylinder mounted on one of said members, an actuating member movably mounted on the other hitch member and having a portion positioned to engage a portion of a piston rod of said brake cylinder, means restraining said actuating member from movement away from said piston rod portion, said restraining means being the sole means for applying pressure through said actuating member to hydraulic fluid in said brake cylinder, and shock absorber means connecting said one member and said actuating member, said shock absorber means providing high resistance to relative movement between said one hitch member and said actuating member upon sudden movement between said two hitch members and providing low resistance to relative movement between said one hitch member and said actuating member upon more gradual movement between said hitch members.

3. A trailer hitch comprising a front hitch member adapted to be connected to a towing vehicle, a rear hitch member adapted to be attached to a trailer, means connecting said hitch members and enabling relative movement therebetween, a hydraulic brake cylinder mounted in a fixed position relative to one of said members, a lever pivotally connected to the other of said members, shock absorber means directly connecting said one member and said lever, said shock absorber means providing high resistance to relative movement between said one hitch member and said lever upon sudden movement between said hitch members and providing low resistance to relative movement between said one hitch member and said lever upon more gradual movement between said hitch members, said lever having a portion positioned to cooperate with a portion of a piston rod of said hydraulic brake cylinder to actuate brakes of the trailer, and resilient means positioned to be moved by said lever and to resist movement of said lever in a direction away from the engaging portion of said piston rod, said resilient means being the sole means for applying pressure through said actuating member to hydraulic fluid in said hydraulic brake cylinder.

4. A trailer hitch for connecting a towing vehicle to a trailer and for actuating brakes of the trailer, said hitch comprising a front hitch member adapted to be connected to the towing vehicle, a rear hitch member adapted to be attached to the trailer, parallel link means pivotally connected to said hitch members to enable relative longitudinal movement between said hitch members, a hydraulic brake cylinder mounted on one of said members, a lever pivotally connected to the other of said members and having means to engage a portion of a piston rod of said hydraulic brake cylinder, shock absorber means connected between said one member and said lever on the side of the lever pivot toward the piston rod engaging means of said lever, said shock absorber means providing high resistance to relative movement between said one hitch member and said lever upon sudden movement between said hitch members and providing low resistance to relative movement between said one hitch member and said lever upon more gradual movement between said hitch members, and resilient means lying in the pivotal path of said lever to contact said lever and resist movement of it away from said piston rod portion.

5. A hitch according to claim 4 wherein said resilient means includes a plate pivotally supported by said other hitch member and lying in the pivotal path of said lever, and a spring engaging said plate in a manner to resist movement of said lever away from said piston rod portion when contacting said lever.

6. A hitch according to claim 5 characterized by means accessible from outside said hitch members for adjusting the compression on said spring.

7. A trailer hitch for connecting a towing vehicle to a trailer and for actuating brakes of the trailer, said hitch comprising a front hitch member adapted to be connected to the towing vehicle, a rear hitch member adapted to be attached to the trailer, means connecting said hitch members and enabling relative movement therebetween, a hydraulic brake cylinder mounted on one of said members, a lever pivotally connected to the other of said members and having means to engage a portion of a piston rod of said hydraulic brake cylinder, shock absorber means connected between said one member and said lever to provide high resistance to sudden movement of said lever toward said brake cylinder, and to provide low resistance to more gradual movement of said lever toward said brake cylinder, stop means cooperating with said other hitch member to limit the extent of pivotal movement of said lever in each direction, and resilient means lying in the pivotal path of said lever to contact said lever and resist movement of it away from said brake cylinder.

8. A hitch according to claim 7 wherein said hitch members have cooperating means to limit the extent of relative movement therebetween.

9. A hitch according to claim 7 characterized by a resilient member resisting movement of said front hitch member toward said rear hitch member.

10. A trailer hitch for connecting a towing vehicle to a trailer having hydraulic brakes, said trailer hitch comprising a front hitch member having socket means adapted to be connected to the towing vehicle, a rear hitch member adapted to be attached to the trailer, parallel link means connecting said hitch members and enabling relative longitudinal movement therebetween, a hydraulic brake cylinder mounted in a fixed position relative to one of said members and having a hydraulic line adapted to connect said cylinder to the hydraulic brakes of said trailer, a piston rod extending out from said brake cylinder and toward the other hitch member, said one hitch member having a guide means slidably supporting said piston rod, a lever pivotally connected to said other member, said lever having a portion positioned to cooperate with a portion of said piston rod to engage said piston rod and move it toward said brake cylinder to actuate the brakes of the trailer, shock absorber means connecting said one member and said lever on the side of the pivot thereof toward the piston rod engaging portion, said lever moving in a direction away from said cylinder by means of said portion of said piston rod when said front and rear hitch members move toward one another, a plate pivotally supported by said other member and lying in the path of said lever when moving away from said cylinder, a spring engaged with said pivotal plate to enable said plate to resist movement of said lever in the direction away from the cylinder, rod means connected to said other member and supporting said spring, and retaining means on said rod means located outside said other member and adjustable on said rod means to adjust the compression of said spring.

11. A trailer hitch for connecting a towing vehicle to a trailer having hydraulic brakes, said trailer hitch comprising a front hitch member having means adapted to be connected to the towing vehicle, a rear hitch member adapted to be attached to the trailer, means enabling relative longitudinal movement between said hitch members, a hydraulic brake cylinder mounted in a fixed position relative to one of said members and having a hydraulic line adapted to connect said cylinder to the hydraulic brakes of the trailer, a piston rod extending out from said brake cylinder and toward the other hitch member, a lever pivotally connected to said other hitch member, said lever having a portion positioned to cooperate with a portion of said piston rod to move said piston rod into said brake cylinder to actuate the brakes of the trailer, shock absorber means connecting said one member and said lever to resist sudden movement of said lever toward said brake cylinder when said front and rear hitch members move suddenly relatively toward one another, a pressure member affixed to said other hitch member on the side of said lever opposite said brake cylinder, resilient means positioned between said pressure member and said lever to resist movement of said lever in a direction away from said brake cylinder, additional resilient means resisting relative movement of said hitch members toward one another, and stop means for limiting the maximum movement of said hitch members toward one another.

References Cited by the Examiner

UNITED STATES PATENTS

| | | | |
|---|---|---|---|
| 2,341,965 | 2/44 | Wagner | 188—112 |
| 2,354,268 | 7/44 | McNamara | 188—112 |
| 2,642,961 | 6/53 | Teal | 188—112 |
| 2,969,857 | 1/61 | Parkhurst | 188—112 |
| 2,973,062 | 2/61 | Tucker | 188—112 |
| 3,007,552 | 11/61 | Eksergian | 188—112 |

ARTHUR L. LA POINT, *Primary Examiner.*

DUANE A. REGER, EUGENE G. BOTZ, *Examiners.*